(12) United States Patent
O'Brien

(10) Patent No.: US 6,287,123 B1
(45) Date of Patent: Sep. 11, 2001

(54) COMPUTER MANAGED LEARNING SYSTEM AND DATA PROCESSING METHOD THEREFORE

(76) Inventor: Denis Richard O'Brien, P.O. Box 544, Charlottesville, VA (US) 22902

( * ) Notice: Subject to any disclaimer, the term of this patent is extended or adjusted under 35 U.S.C. 154(b) by 0 days.

(21) Appl. No.: 09/281,103

(22) Filed: Mar. 29, 1999

Related U.S. Application Data

(60) Provisional application No. 60/099,497, filed on Sep. 8, 1998.

(51) Int. Cl.[7] ................................................. G09B 19/00
(52) U.S. Cl. ........................................... 434/118; 434/322
(58) Field of Search .................................. 434/350, 118, 434/322, 323, 353; 706/927

(56) References Cited

U.S. PATENT DOCUMENTS

| | | |
|---|---|---|
| 5,059,127 | 10/1991 | Lewis et al. . |
| 5,211,563 | 5/1993 | Haga et al. . |
| 5,261,823 | 11/1993 | Kurokawa . |
| 5,827,070 | * 10/1998 | Kershaw et al. ................... 34/322 X |
| 6,024,577 | * 2/2000 | Wadahama et al. ............. 434/322 X |
| 6,039,575 | * 3/2000 | L'Allier ............................ 434/323 X |
| 6,064,978 | * 5/2000 | Gardner et al. .................... 705/10 X |
| 6,120,300 | * 9/2000 | Ho et al. ............................ 434/332 X |

\* cited by examiner

Primary Examiner—Valencia Martin-Wallace
Assistant Examiner—Chanda Harris
(74) Attorney, Agent, or Firm—Denis R. O'Brien

(57) ABSTRACT

A Computer Managed Learning System (CMLS) and process are provided by which an information database is produced by formatting the information to be learned into units; inputting the units of information into a computer system; storing the units of information in discrete locations on a storage media; and, assigning to each unit an Importance Rank, a provisional Individualized Difficulty Rank (IDR), a provisional Individualized Urgency Rank (IUR), a provisional Population Difficulty Rank (PDR) and a provisional Population Urgency Rank (PUR), which are also stored in discrete locations on storage media. When a student accesses the database, the student may elect to filter the units by specifying subject matter and/or ranges for IDR, Importance-rank and IUR, or combinations or permutations thereof. The system selects the appropriate units from the database according to the filtering criteria input by the student. The selected units are sorted into random order by the system and then displayed in that order by an output device. The student responds to the information displayed, a determination is made as to whether the student's response was satisfactory, and the system re-calculates the IDR, PDR, IUR and PUR values of the unit according to whether or not the student's response was satisfactory. The new IDR, PDR, IUR and PUR values are stored in their respective locations on the storage media to be used for subsequent filtering and tagging procedures, and the process is repeated as necessary until the required level of learning has been achieved.

22 Claims, 9 Drawing Sheets

TIER AND CODE ASSIGNMENTS FOR IMPORTANCE, DIFFICULTY AND URGENCY

| CODE | IMPORTANCE | IDR/PDR | IUR/PUR |
|---|---|---|---|
| TVU | TRIVIAL | VIRGIN | UNRANKED |
| TOU | TRIVIAL | HONEYMOON | UNRANKED |
| TSS | TRIVIAL | SIMPLE | SAFE |
| TES | TRIVIAL | EASY | SAFE |
| TMS | TRIVIAL | MEDIUM | SAFE |
| THS | TRIVIAL | HARD | SAFE |
| TIS | TRIVIAL | IMPOSSIBLE | SAFE |
| MVU | MODERATE | VIRGIN | UNRANKED |
| MOU | MODERATE | HONEYMOON | UNRANKED |
| MSS | MODERATE | SIMPLE | SAFE |
| MES | MODERATE | EASY | SAFE |
| MMR | MODERATE | MEDIUM | SERIOUS |
| MHR | MODERATE | HARD | SERIOUS |
| MIC | MODERATE | IMPOSSIBLE | CRITICAL |
| EVU | ESSENTIAL | VIRGIN | UNRANKED |
| EOU | ESSENTIAL | HONEYMOON | UNRANKED |
| ESS | ESSENTIAL | SIMPLE | SAFE |
| EER | ESSENTIAL | EASY | SERIOUS |
| EMR | ESSENTIAL | MEDIUM | SERIOUS |
| EHC | ESSENTIAL | HARD | CRITICAL |
| EIC | ESSENTIAL | IMPOSSIBLE | CRITICAL |
| VVU | VITAL | VIRGIN | UNRANKED |
| VOU | VITAL | HONEYMOON | UNRANKED |
| VSS | VITAL | SIMPLE | SAFE |
| VER | VITAL | EASY | SERIOUS |
| VMC | VITAL | MEDIUM | CRITICAL |
| VHC | VITAL | HARD | CRITICAL |
| VIC | VITAL | IMPOSSIBLE | CRITICAL |

Fig. 9.

COMPUTER MANAGED LEARNING SYSTEM AND DATA PROCESSING METHOD THEREFORE

CROSS-REFERENCES TO RELATED APPLICATION

Reference is made to Provisional Application 60/099,497, filed Sep. 8, 1998, the benefits of which are claimed pursuant to Title 35 U.S.C. §119(e).

BACKGROUND OF THE INVENTION

1. Field of the Invention

The field of this invention is computer managed learning systems (CMLS), also referred to as computer-assisted learning systems, computer-aided instruction, electronic learning systems, computer-assisted testing, and various other names. With respect to the present application, the term CMLS encompasses all uses of computer software and hardware to facilitate, expedite and organize educational and learning processes such as, without limitation, studying, reviewing, memorization, evaluation and self-assessment.

2. Description of the Prior Art

Many students find learning, particularly memorizing, large amounts of material to be a difficult, tedious and unpleasant chore primarily because their study methods are ineffective and inefficient. Such students typically struggle when it comes to taking examinations and frequently perform poorly even though they may be quite intelligent.

Boredom and lack of organization are two major barriers that must be overcome if a student is to achieve academic success. While boredom is often mitigated by motivating factors such as fear of failure or hope of potential rewards, lack of organization is more pernicious and usually a lot more difficult for students to overcome. Of particular interest in regards to organizing study time is the inability of some students effectively to differentiate material they have already mastered from material they haven't. Students have a natural tendency to focus more on material they like, which is usually material they already know, to the exclusion of more difficult material or material they do not like. One key to academic success i being able to differentiate the material one knows from the material one does not know. Only then can the student focus his or her attention most effectively.

These problems are exacerbated when students face college entrance examinations, professions school entrance examinations or professional bar or board examinations. Frequently, such examinations cover very large amounts of information that was originally presented over a number of years of course work, yet the material must be reviewed and memorized within a few weeks or months prior to the examination. The large amount of information to be memorized and the short time-frame for preparation make organization absolutely essential for success—wasting limited time reviewing information the student already knows can seriously undermine the student's efforts.

One time-honored method of overcoming such detrimental disorganization is the use of "flash cards," which are individual cards usually made of a stiff paper and having a question or stimulus printed on one side and the correct response printed on the other. When the student successfully answers a specific question correctly, that card is put into one pile, which cards with questions that were missed are put into a separate pile. Such rudimentary systems for organizing learning and memorization tasks have been known and used for many generations; however, more powerful methods can now be effected by the use of CMLS's.

CMLS's are valuable tools for learning and for preparing for examinations because they can be used to: 1) store and present information to be learned/memorized in an orderly fashion; 2) provide feedback to students regarding their progress in an absolute sense and relative to one another; 3) provide feedback to teachers and administrators regarding the progress of individual students or groups of students; 4) give direction to students in order to help them identify and overcome weaknesses.

Four essential elements comprise a CMLS: 1) one or more persons wishing to learn or memorize information, said person or persons being referred to herein as the "student(s)" or "user(s);" 2) the computer system, which includes hardware and software for effectuating data input data output, data storage, and data processing; 3) "information databases," which contain the material to be learned; and 4) "control databases" which contain descriptive and statistical data about, without limitation, the material to be learned, the student and the student's progress or status, and the class and its progress.

Three basic configurations of CMLS's are widely used:

(a) Stand-alone. The computer system is isolated from control or input from external sources other than the use. Such systems are most often designed for use with isolated (i.e., non-networked) personal computers and laptops. The operating programs and the databases are accessed locally and may be stored within the system or provided to the system on an ad hoc basis by means of a floppy disk or other portable storage media. Generally, only one student may access a stand alone system at a time.

(b) Central control and storage. All operating programs are stored in and executed by a centrally located computer. Information and control databases are also stored centrally and are accessed through the centrally located computer. One or more students connect to the centrally located computer from computer terminals that are physically, and often geographically, remote from the centrally located computer. The students' remote terminals are used primarily to effectuate input, access the centrally located computer and display output sent from the centrally located computer. Little or no data processing and storage are carried out by the remote terminals.

(c) Remote control and central storage. In this configuration information databases are stored in a centrally located storage device and accessed by operating programs running at one or more remote computers. The information to be learned is transmitted from the central computer to the remote computers. The information to be learned is transmitted from the central computer to the remote computers. Control databases may be stored in either the remote computer or in the central computer, in either case they are accessed and modified as necessary by the remote computer.

Various combinations, hybrids, and modifications of the foregoing three basic configurations are known and widely employed. Configurations (b) and (c) are favored for a number of reasons. For instance, when used in local area networks or with the Internet, these configurations allow multiple students to access a single database simultaneously and they allow information regarding the student population to be gathered and statistical analysis thereon to be performed easily.

Computer managed learning systems can be used to assist in learning any information that is amenable to being learned. Whatever configuration the CMLS assumes, the material presented by a CMLS is generally derived from compilations of information. These compilations are referred to in the present application as "sources." Although a source may take any conceivable format, in most cases it is a textbook or other authoritative re-statement of information that is generally accepted in the specific field that the student endeavors to master. The information itself may encompass such things as verifiable facts, theories, ideas, controversies, procedures, laws, systems, descriptions of nature and natural processes, and descriptions of human products, behavior, history, achievements, and technology.

CMLS's present information to the student in "units", which are called different things by different authorities, such as "blocks," "screens," or "pages." the term "unit" as used herein refers to a quantum of information that is to be learned. Frequently information databases are organized as a series of question-answer units called "items" in the parlance of the art. An item consists of a stimulus, which is a question or a statement, and a corresponding and appropriate answer. This format is referred to as a "question and answer format" even though the stimulus may be in the form of a statement instead of a question, for instance in "True/False" or "Yes/No" type items. The student's input, referred to herein as the "response," may be the process of choosing the best of two or more possibilities presented by the computer. This is often referred to as a "multiple choice" or "multi-choice" format. Multi-choice, Yes/No and True/False type of items are referred to as "objective items." Other types of items include "short-answer" in which the student's response is in the form of brief statement, and "essay" in which the student's response is more involved and more open-ended, often taking the form of a paragraph or essay.

Patents have been obtained on CMLS's that present units sequentially in a pre-determined order or in an order determined as a result of the interaction between the student and the computer. For instance, Haga et al., (U.S. Pat. No. 5,211,563) have obtained a patent on a CMLS in which the information is presented in "blocks," each block having a identifier that is used to link it to other relevant blocks in a manner that customizes the presentation to meet each individual student's needs.

Computer managed learning systems that employ information databases comprised of items, as opposed to blocks, generally present a stimulus first and then the student inputs his or her response. Finally the computer presents a correct answer, unless the system is being used to assess the student, in which case the answer is, for obvious reasons, not provided. Many CMLS's are capable of determining whether the student's response is correct, particularly if the items are the objective type. As of the present, short-answer and essay items are not widely used by CMLS's because the great variation and open-ended nature of the responses obviates computerized evaluation of the response.

More sophisticated CMLS's use the students' responses to calculate estimations of the students' mastery of the subject. In configurations (b) and (c) above, where many students access a central program and/or database, the CMLS may analyze the progress of a specific student relative to other students studying the same material, or the progress of the student population as a whole. Sophisticated CMLS's used for formal assessment have been patented in which the items are pre-ranked for difficulty and the system present an item of appropriate difficulty based on how the student has performed on previous items. Such a system is described by Lewis et al. (U.S. Pat. No. 5,059,127, Oct. 22, 1991). Another approach, which has been patented by Kurokawa (U.S. Pat. No. 5,261,823 Nov. 16, 1993), is to have the computer present items of varying difficulty based on the individual student's scholastic standing relative to other students studying the same material.

SUMMARY OF THE INVENTION

Shortcomings of Prior Art that are Overcome

Existing CMLS's fail to recognize and resolve certain fundamental difficulties inherent in all forms of teaching, both human-based and computer-based. For instance, they fail to recognize that any given unit of information will be difficult for some students and easy for others, and that neither and individual students' scholastic standing (Kurokawa, 1993) nor his performance on other items in the database (Lewis et al., 1991) will predict whether an individual unit is difficult or easy for that specific student. Even more vexing for existing CMLS's is the fact that the difficulty of any given unit is a dynamic quantity in the sense that a unit that is difficult for a particular student today may be (and hopefully will be) quite easy for the same student in the future, or, possibly, it will be more difficult. While some CMLS's allocate a difficulty ranking for individual units based on the teacher'perceptions or upon a statistical analysis of a group of students' past performance with those units, such systems ignore the fact the fact that each student is an individual and that the difficulty of a specific unit for a specific student is not static and cannot be determined by a teacher or by analyzing group behavior of students. The difficulty of a specific unit of information for a specific student at a specific point in time is best estimated by that student's prior performance with that specific unit. And it is the aggregate of the individual student's experience with all of the units comprising the database that best estimates the student's overall mastery of the subject matter.

Another problem that existing CMLS's fail to overcome is that students have a tendency to spend inordinate amounts of time on information that is easy or that they already know. Thus, their time is not well apportioned between material they find difficult and material they find easy; hence, studying efficiency suffers. There are a number of reasons why students spend a disproportionate amount of time on the material that they already know. First, students like material that is easy, and they avoid material they dislike. More problematic is the inability of students to identify the material that is difficult for them. Often they are misled by population-based difficulty rankings or by the judgment of their teacher or whomever produced the database. If a unit has been labeled as easy by the teacher's judgment or some statistical analysis based on an entire user-population, the student may be misled in to thinking that the unit is easy when in fact it might be quite difficult for the individual student.

A parameter utilized by the present invention that describes how difficult a specific unit is for an individual student at a specific point in time is referred to herein as the unit's "Individualized Difficulty Rank" (IDR). The parameter IDR must be distinguished from estimations of difficulty that are based on a student's scholastic standing or on an arbitrary judgment-call of a teacher. The IDR may be measured or calculated by a variety of means. For example, where the units are in the item format, the IDR may be calculated as the percentage of correct responses the individual student has made to the instant item.

The IDR must also be distinguished from measures of a unit's difficulty based on the performance of the user-population. In the present invention the population-based estimation of unit difficulty is referred to as "Population Difficulty Rank" ("PDR"), which may be measured or calculated by a variety of means, such as the proportion of a user-population that has performed satisfactorily with regards to the unit.

Another shortcoming of existing CMLS's is that they fail to distinguish between difficulty and importance. The IDR of a unit is a dynamic parameter that varies with time in respect to each student and each unit. Likewise, the PDR of a unit is also dynamic in that it changes as the use-population repeatedly accesses that unit. On the other hand, the importance of a unit is static, for it does not change from student to student, nor does it change as a function of time for any given student or group of students. Furthermore, unlike IDR and PDR, the importance of a unit cannot be calculated and assigned by the computer or by the student because the one assigning an importance rank to a unit must have enough familiarity with the subject matter in its entirety to be able to judge the relative importance of each unit.

The parameter used in the present invention that describes the importance of an individual unit is referred to herein as the unit's "Importance Rank." This parameter is assigned to each unit comprising the database by the person who composes the database. Once set, a unit's Importance Rank does not change as a function of the individual student's or class's efforts.

Because they fail to distinguish difficulty from importance, existing CMLS's are unable to combine these independent parameters into a single parameter that represents the exigency with which the unit or information should be attended to. For instance, a unit that is both very important and very difficult should command more immediate attention by the student than a unit that is trivial and simple. Thus, one may perceive that there is an "urgency" spectrum or scale, which, once recognized, can be used to enhance study efficiency.

As noted above, two forms of difficulty ranking are distinguished by the present invention: individual-based difficulty ranking (IDR) and population-based difficulty ranking (PDR). When each of these is combined with a unit's importance, they yield two types of urgency ranking, which are designated herein as Individual Urgency Rank (IUR) and Population Urgency Rank (PUR). The IUR of a unit is a derivative measure of how exigent that unit is at the present moment for that particular student; whereas, the PUR of a unit is a derivative measure of how exigent the unit is based on the performance of the entire user-population. The means for ascertaining IUR and PUR are described below. Although of less value that the IUR in helping the student allocate study time, the PUR is useful in allowing the student to compare his strong and weak points with those of the rest of the user-population.

Because existing CMLS's fail to recognize and distinguish difficulty, importance and urgency of units, and because they fail to accommodate that fact that each student has his or her own strengths and weaknesses, existing CMLS's do not optimize study efficiency by allowing each student to identify and focus on the material that is most difficulty and/or most urgent for him.

Objects of the Invention

The invention solves the foregoing problems by attaining the following objects:

One object of the invention is to provide a CMLS means and a process of formatting into discrete units information that is to be learned;

Another object of the invention is to provide a CMLS means and a process of constructing and accessing databases comprised of units of information whereby each unit of information is assigned IDR and PDR values representing how difficulty that unit of information is for the specific student and for the user-population, respectively;

Another object of the invention is to provide a CMLS means and a process of constructing and accessing databases comprised of units of information whereby the IDR and PDR of a unit of information are re-evaluated and modified as necessary to reflect the performance of the individual student and the entire user-population, respectively;

Another object of the invention is provide a CMLS means of constructing and accessing databases comprised of units of information whereby each unit of information is assigned an Importance Rank that represents how important that quantum of information is within the context of the overall subject matter;

Another object of the invention is to provide a CMLS means of constructing and accessing databases comprised of units of information whereby each unit of information is assigned IUR and PUR values that are individual-based and population-based measures, respectively, of the urgency with which a specific student should attend to that unit of information;

Another object of the invention is to provide a CMLS means and a process of constructing and accessing databases comprised of units of information whereby the units of information can be recalled and displayed on the basis of subject matter and/or on the basis of a the pages or chapters of the source from which the information was extracted;

Another object of the invention is to provide a CMLS means and a process whereby the student is directed to the page and/or chapter in the source from which each unit was extracted so that the student may easily consult the source for the information represented by each unit;

Another object of the invention is to provide a CMLS means and a process whereby units of information may be recalled and displayed on the basis of subject matter, IDR, Importance Rank, or IUR, or any combination or permutation of subject matter, IDR, Importance-ranking and IUR. The process of recalling and displaying specific units of information on the basis of Preferred Values of, IDR, Importance Rank and/or IUR is referred to herein as "filtering," and the process of identifying units that fulfill all of the filtering criteria is referred to herein as "tagging."

In order to achieve the foregoing objects, the present invention provides a method for: producing an information database by formatting the information to be learned into units; inputting the units of information into a computer system; storing the units on at least one computer-accessible storage device and, assigning to each unit an Importance Rank and a provisional IDR and IUR, which are also stored on at least one computer-accessible storage device. When a student accesses the database, the student may elect to filter the units by specifying subject matter and/or ranges for IDR, Importance Rank and IUR, or combinations or permutations thereof. The computer system selects the appropriate units from the database according to the filtering criteria input by the student. The selected units are sorted into a random order by the system and then displayed seriatim by an output device. The student's performance with respect to each unit is input and a determination is made whether the student's response was satisfactory. The system re-calculates the values of the dynamic parameters IDR, PDR, IUR and PUR of the unit according to whether or not the student's response was satisfactory. The new values are stored in their respective locations on the storage media to be used for subsequent filtering and tagging procedures.

BRIEF DESCRIPTION OF THE DRAWINGS

The above and other objects, features and advantages of the invention will become more apparent from the following description taken in connection with the accompanying drawings, in which:

FIG. 9 is a tabular presentation showing the names and interrelationships of the tiers for IDR/PDR, IUR/PUR and Importance ranking. Also shown in the 3-character strings that encode the difficulty, importance and urgency tiers.

DETAILED DESCRIPTION OF PREFERRED EMBODIMENT

The present invention is directed to a method for facilitating learning/memorization tasks, particularly including, but without limitation, the learning and memorization of large amounts of information that must be mastered in order to pass large, professional-type examinations.

Overview of the Preferred Embodiments of the Invention

The embodiment described herein is a stand-alone system i.e., Configuration (a), in which the operating instructions ("core program") and the databases accessed by the core program are contained within a single computer that is not connected to a network or central computer. Embodiments embracing Configurations (b) and (c) are discussed later. These embodiments all rely on units of information in the form of items; however, it is anticipated that the invention is applicable to other formats in which the information to be learned may exist.

The embodiment described herein has been implemented with a Visual C++® (version 5) compiler, produced by Microsoft® Corporation. However, from the description and figures provided herein, a person skilled in the art can implement the invention in any appropriate programming language.

Figure 1:
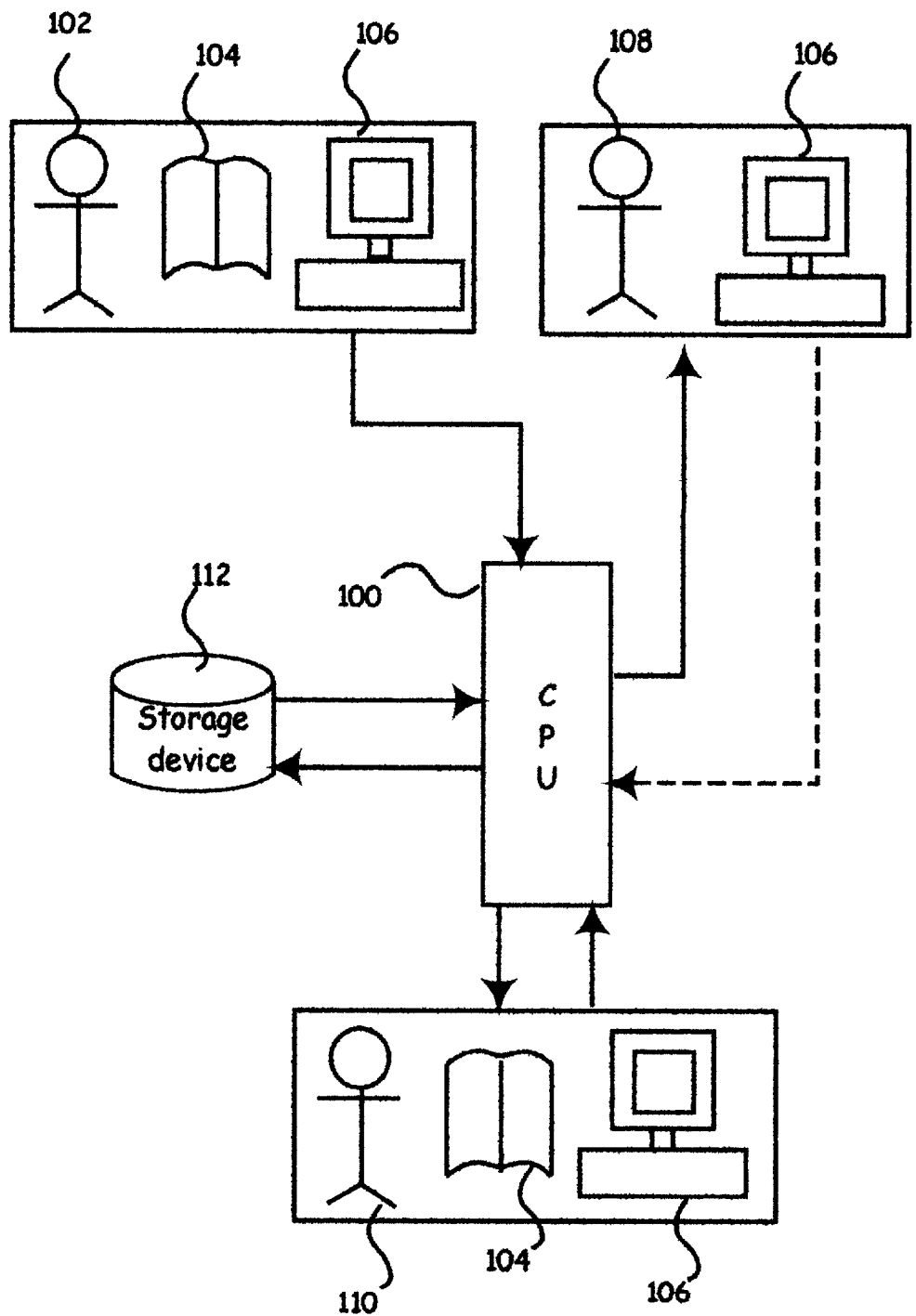
FIG. 1 is a diagram depicting the relationships between the main components of a stand-alone configuration of the present invention.

In the present embodiment, said data processing system comprises a computer system modified or programmed in such a way as to carry out the objects of the invention. The relationship between the various components of the stand alone system is diagramed in FIG. 1.

An information database, referred to herein as a ".QA file," is produced by an originator 102 using one or more sources 104 and a computer terminal 106, the computer terminal having standard input means such as a keyboard and pointing device and standard output means such as a display and printer.

The originator converts information from the source to an item format and inputs the items via the computer terminal to the central processing unit (CPU) 100. The CPU encodes the information as items and stores them by means of a storage device 112, which comprises storage media, a means for creating locations on the storage media, a means for writing data to the locations on the storage media, and a means for reading data from the locations on the storage media. For each item, the originator also inputs a reference number such as the page number and/or chapter number identifying the specific site in the source where the information used to produce the item can be found. This information is written to the storage media of the storage device. Finally, the originator assigns an Importance Rank to each item, which is also written to the storage media of the storage device. The originator repeats this process until all of the items have been input and the item database is complete. (Details of the structure of this database are described below.)

The CPU 100 initializes two additional files referred to herein as a ".SI file." and a ".CNT" file. When there are a plurality of users, a .CNT file is placed in separate directories prepared by the CPU on the storage media with one such directory being produced and initialized for each user. The structure of the SI and CNT files are described in detail below.

Once a database and its related files have been completed and initialized, the student 110 may gain access to them through the computer terminal 106, which opens the files by means of the CPU 100. The student may enter various criteria for filtering the items on the basis of subject matter (i.e. page and/or chapter), IDR, Importance or IUR. The CPU then filters the database and tags just those items that meet the student's criteria. These tagged items are presented to the student in random order.

For each item in turn, the computer presents the stimulus and the student inputs his response. Upon demand, the correct answer is displayed and the student is asked to indicate whether his response was correct.

Embodiments are anticipated in which the CPU 100 is able to evaluate the student's answer, particularly if objective-type items are used. This obviates the need for the student to assess his own answer. However, this self-grading feature is not used in the present embodiment for two reasons. First, at present computers cannot grade short-answer and essay type responses reliably; therefore, in order that short-answer and essay type items may be easily accommodated, the preferred embodiment relies on the student's own judgment of whether his response was correct. Second, by forcing the student to determine whether his answer was correct, the student must compare his response with the correct response. This process of comparing the two responses has great value in reinforcing the information.

Once the student inputs whether he got the present item right or wrong, the CPU 100 uses that information to re-calculate the IDR and IUR, of the current item, as described below. This updated information is then written to the storage medium 112.

As the student works his way through the item database, he may refer to his copy of the source 104 as often as necessary to clear up any difficult or misunderstood points. This is easily done because each item is identified with the source page number from which the item was extracted and this information is displayed at the same time the answer is.

The details of each student's performance are written to the storage medium 12. In those situations in which there is a population of users, such as a class, each student has his personal data in the form of his personal .CNT file, which is maintained and stored in a directory separate from every other student. The CPU 100 has access to these .CNT files and, hence, access to the data generated by each student. The CPU uses that data to calculate population-level statistics such as PUR and PDR, as described below. An administrator 108 may access the data via the CPU by using the computer terminal 106 in order to monitor the progress of individual students and/or the entire class. Occasionally, the administrator may edit items, inactive/reactive items, or analyze statistical data previously written to the storage medium.

In addition to the interactive mode, just described, the information database may be accessed via two additional modes. The first additional mode is what is referred to herein as "browsing." This occurs when the items are presented to the student, but no indices of the student's performance are recorded. Thus, the student may step through the items of the .QA file without altering the IDR, PDR, IUR or PUR of the items. This perusal mode is used to help the student consolidate the information contained in the database. Ideally, the student has access to the source 104 when working in this mode and a three-way interaction occurs between the student 110, the computer 106 and the source. The browsing mode is discussed in detail below.

The second additional mode for accessing the database is by designing and taking written practice examinations. This a more formal approach to studying the information. It is based on pen and paper examinations of the information in the database, as described below, and is meant to simulate real test conditions.

The Databases Files

The core program encodes, accesses, and modifies four classes of data as follows: 1) the information to be learned, said information being organized into a plurality of units, each unit comprising an "item;" 2) data that describes the information to be learned or memorized (including the name of the textbook or other source from which the information to be learned or memorized has been extracted) and statistics such as frequency of use of the database by the population of users; 3) data describing each individual item, including each items's Importance Rank, population-level statistics (PDR and PUR), number of times the item has been accessed by the class, and the number of times the item has been answered correctly by the class; 4) data that describe the individual student and individual-level statistics (IDR and IUR) with respect to that student for each item and for the item-database as a whole.

The foregoing classes of data are contained in three types of database files designated: 1) ".QA" (question and answer), 2) ".CNT" (control) and 3) ".SI" (source information). These designations are "filename extensions" in the parlance of the art. For example, for a database derived from a procedures manual called "MPEP," the files might be labeled "MPEP.QA," "MPEP.CNT" and "MPEP.SI."

The .QA files hold the items and some population-level descriptive data, such as each item's PDR and PUR, as described below.

The .SI files hold information about the source as well as information regarding how the items of the database are allocated among the various IDR, IUD, IUR, and PUR tiers, as described in detail below.

THE .CNT files are specific to each user, each file holding information at the individual user-level relevant to a specific user's past performance on each item. This information includes each item's IDR and IUR, as described below.

Organization of .QA Files

A .QA file is comprised of one-dimensional array (".QA Array") of one or more records (".QA records"), each record representing a single item and accompanying descriptive and population-level data. The size of any .QA array is the total number of items plus one. The record in the [0] position of the array is a dummy record containing no data, but the fields of this record may be used for various administrative tasks. (Elements or positions of an array are denoted herein with square brackets [], according to be accepted practice in the field.) Each record occupying array positions [1] or greater is comprised of eight fields (".QA fields") that contain the following data:

The $1^{st}$ .QA field holds the stimulus (question).

The $2^{nd}$ .QA field holds the correct response to said stimulus (answer).

The $3^{rd}$ .QA field holds an integer with which to identify the item.

The source's page number and the chapter number—where the information may be found—are held in the $4^{th}$ and $5^{th}$ .QA fields, respectively.

The $6^{th}$ .QA field holds an integer counter for the total number of times the present item has been attempted by members of the user-population.

The $7^{th}$ .QA field holds a counter for the total number of correct responses to the present item made by members of the class.

The $8^{th}$ .QA field holds a three-character string that encodes the item's Importance-rank, PDR, and PUR, as described in more detail below.

Organization of .SI Files

The .SI file for each database contains descriptive information regarding the source and the database. This file comprises a single record with twenty-three fields as follows:

The $1^{st}$ .SI field holds a string representing the name of the source and descriptive information including author, title, edition, year of publication, etc.

The $2^{nd}$ .SI field holds a string representing the name of the author of the source or some other string that may be used to identify the files. This string is used to derive a filename common for the three database files—.QA, .SI and .CNT.

The $3^{rd}$ .SI field holds a counter used to record the number of times the database has been used by all students having access to the database.

The $4^{th}$ and $5^{th}$ .SI fields hold integers representing, respectively, the lowest page number of the source from which an item was extracted and the highest page number of the source from which an item was extracted. These values are used in limiting the page-range by which the student may filter the database.

The $6^{th}$ and $7^{th}$ .SI fields hold integers representing, respectively, the lowest chapter number of the source from which an item has been extracted and the highest chapter number of the source from which an item has been extracted. These values are used in limiting the chapter-range by which the student may filter the database.

The $8^{th}$ .SI field holds an integer representing the total number of items in the database.

The $9^{th}$ through the $15^{th}$ .SI fields, inclusive, hold integers that represent the current number of items at each of the seven IDR tiers. These tiers are described below.

The $16^{th}$ through the $19^{th}$ .SI fields, inclusive, hold integers that represent the current number of items at each of the four Importance Rank tiers. These tiers are described below.

The $20^{th}$ through the $23^{rd}$ .SI fields, inclusive, hold integers that represent the current number of items at each of the four IUR tiers. These tiers are described below.

Organization of .CNT Files

The .CNT file is comprised of an one-dimensional array (".CNT Array" herein) of records. The length of the array is n records plus one, where n is the number of items in the corresponding .QA file. Each .CNT record except the one occupying the [0] position of the .CNT Array, is related to the corresponding item in the same array position of the .QA Array.

The .CNT records contained at elements [1] through [n] of the .CNT Array are comprised of four fields that hold the following information.

The $1^{st}$ .CNT filed holds a three-character string that encodes the Importance, IDR and IUR, respectively, of the corresponding item in the .QA Array, as described in more detail below.

The $2^{nd}$ .CNT field holds an one-dimensional array of integers. This array is eight elements long and is referred to herein as the "Right Array." This Right Array is used to track the student's and wrong responses over the last eight attempts to answer the item. This history is then used to calculate the IDR of that item, as described below.

The $3^{rd}$ .CNT field holds an item-identifying integer that is identical to the integer held by the $3^{rd}$ field of the corresponding record of the .QA Array. These integers are used to maintain congruence between the .QA and .CNT records when records are deleted or sorted, etc.

The $4^{th}$ .CNT filed holds an integer representing the total number of times the student has attempted the corresponding item in the .QA Array.

The aforementioned four fields of the .CNT records refer only to those records held in positions [1] through [n] of the .CNT Array. The record occupied by position [0] of the .CNT Array holds the following information.

The $1^{st}$ field holds a null string, which is not used.

The [0] element of the 8-element Right Array holds an integer representing the number of times the student has accessed the corresponding .QA file.

the [1] element of the 8-element right Array holds an integer representing the student's overall mastery of the corresponding .QA file.

The remaining elements of the 8-element Right Array hold a null value of 0 and are not used.

The $3^{rd}$ field holds an integer code, referred to herein as the "user ID number," used to identify individual users and to grant differing levels of access to the database. For instance, administration personnel may have access to item editing utilities or statistics that student users do not have access to, and, hence, this field provides a means of identifying those users with different access levels.

The $4^{th}$ field holds a null integer of 0 and is not used.

Definitions and Assignment of Importance, Difficulty and Urgency Levels

The embodiment of the invention described herein uses seven-tier difficulty rankings (IDR and PDR), a four-tier importance ranking, and four-tier urgency rankings (IUR and PUR). These tiers and the methods for determining them are described now.

Individualized Difficulty Rank (IDR), the parameter that describes how difficult the instant item is for the instant student, is calculated for each item on the basis of how frequently the student has gotten that item correct in the previous eight attempts, assuming it has been attempted at least eight times. The choice of eight attempts as the cut-off for calculating IDR is arbitrary and has been determined empirically. The use of other values, or no cut-off at all, is anticipated and may produce satisfactory results.

Population Difficulty Rank (PDR), the parameter that describes how difficult the instant item is for the entire class, is calculated on the basis of how frequently the whole class has gotten that item correct.

The seven-tiers of IDR's and PDR's are re-calculated for the instant item by the system as described below each time the student answers the item. The terms below are used to designate the seven tiers of both the item's IDR and PDR. It must be noted, however, that although identical terms are used to label the IDR and PDR tiers, IDR and PDR are independent measures of the difficulty of an item. While the PDR of an item will be the same for all students at a given point in time, the IDR will be specific to each student. The IDR and PDR tiers used in the present embodiment are as follows:

Virgin. This is a provisional difficulty rank. In terms of IDR, Virgin items are those items that have never been attempted by the specific student. In terms of PDR, Virgin items are those items that have not yet been attempted by any member of the user-population.

Honeymoon. This is a provisional difficulty rank. A statistically meaningful measurement of how difficulty an item is requires that the student make at least three attempts to answer that item. Items that have been attempted by the student one time but less than three times cannot be accurately assessed as to difficulty and are thus assigned the provisional IDR of Honeymoon. In terms of PDR, an item that has been attempted by at least one member of the study population is ranked as Honeymoon until it has been attempted once by more than 30% of the study population or it has been attempted twice by more than 60% of the study population. These threshold values are arbitrary and have been determined empirically; other values may also produce satisfactory results.

Simple. Items that have been attempted by the student three or more times and have been missed no more than 5% of the time in the last eight attempts are assigned the IDR of Simple.

In terms of PDR, an item is ranked as Simple when it has been attempted once by more than 30% of the class, or it has been attempted twice by more than 60% of the class, and no more than 5% of the total of all attempts have been incorrect.

Easy. Items that have been attempted by the student three or more times and have been missed more than 5% of the time but less than 31% in the last eight attempts are assigned the IDR of Easy.

In terms of PDR, an item is ranked as Easy when it has been attempted once by more than 30% of the class, or it has been attempted twice by more than 60% of the class, and it has been missed more than 5% of the total of all attempts but less than 31%.

Medium. Items that have been attempted by the student three or more times and have been missed at least 31% of the time but less than 61% in the last eight attempts are assigned the IDR of Medium.

In terms of PDR, an item is ranked as Medium when it has been attempted once by more than 30% of the class, or it has been attempted twice by more than 60% of the class, and it has been missed more than 30% of the totals of all attempts but less than 61%.

Hard. Items that have been attempted by the student three or more times and have been missed at least 61% of the time but less than 95% in the last eight attempts are assigned the IDR of Hard.

In terms of PDR, an item is ranked as Hard when it has been attempted once by more than 30% of the class, or it has been attempted twice by more than 60% of the class, and it has been missed more than 60% of the total of all attempts but less than 95%.

Impossible. Items that have been attempted by the student three or more times and have been missed 95% of the time or more in the last eight attempts are assigned the IDR of Impossible.

In terms of PDR, an item is ranked as Impossible when it has been attempted once by more than 30% of the class, or it has been attempted twice by more than 60% of the class, and it has been missed 95% or more of the total of all attempts.

The foregoing values for calculating IDR and PDR tiers are arbitrary and have been determined empirically. It is anticipated that other terms values or means of calculating IDR and PDR may be used with satisfactory results.

It should be noted that both the IDR and the PDR are dynamic parameters; i.e., the IDR and PDR of an item are re-calculated each time the student attempts that item. Importance Rank, a second parameter used to describe items, is distinct from IDR or PDR. When the database is produced by the originator 102, one of four Importance Rank tiers is assigned to each item on the basis of how essential that information is to understanding the subject at hand. The four Importance Rank tiers are as follows:

Trivial. Information that is interesting, often for historical or background purposes, but that is not required for a complete understanding of the subject. This type of information is often used to identify students who have an excellent command of the subject.

Moderate. Information that is required in order to achieve a very good command of the subject.

Essential. Information that is required in order to acquire a moderate command of the subject.

Vital. Information that must be mastered in order to acquire the minimal acceptable level of competence in the subject. In some mastery-learning paradigms, failure of a student to answer correctly even a single item ranked "vital" is sufficient to fail the student.

Unlike IDR and PDR, Importance Rank is static; i.e., once set, it does not change as a result of a student's or the class's interactions with the database. However, by accessing editing subroutine 617, described below, the administrator 108 may modify the Importance Rank of any item.

As noted above, the importance and difficulty of an item may be combined to produce a derivative parameter referred to herein as Urgency. When the difficulty is measured as IDR, the resulting measure of urgency is referred to as the Individualized Urgency Rank (IUR). Likewise, when the difficulty is measured as PDR, the resulting measure of urgency is referred to as the Population Urgency Rank (PUR). In the present embodiment both IUR and PUR have four tiers: Unranked, Safe, Serious, Critical. It must be noted, however, that although identical terms are used to label the IUR and PUR tiers, IUR and PUR are independent measures of the urgency of an item. While the PUR of an item will be the same for all students at a given point in time, the IUR will be specific to each student.

The PUR and IUR are, essentially an item's difficulty (PDR) or IDR, respectively) weighted to account for its importance. Given an item's Importance Rank, which is set by the database originator 102, and given the item'IDR and PDR, which are determined by the frequency of correct responses to the item, IUR and PUR are defined and determined by reference to FIG. 9.

For example, assume that item 175 is the active database has an Importance Rank of "Essential." Further assume that student X has attempted item 175 at least three times and the item's IDR is currently "Medium," with respect to student X. Applying the table of FIG. 9, it can be seen that the IUR of item 175 with respect to student X is "Serious." Should student X fail to answer item 175 correctly a sufficient number of times to cause its IDR to change to "Hard," then the IUR of that item will become "Critical." A similar relationship, based on the table of FIG. 9, exists between the PDR and PUR of each item.

The three-character code shown in the first column of the FIG. 9 is unique for each combination of Importance, Difficulty and Urgency. This code, as it pertains to individual-level parameters (IDR and IUR), is held in the $1^{st}$ field of each .CNT record. As it pertains to population-level parameters (PDR and PUR), it is held in the $8^{th}$ field of each .QA record. It is by accessing the code in the .CNT file to determine the item's IDR, Importance Rank and IUR that items are filtered.

Logging On

Figure 2:
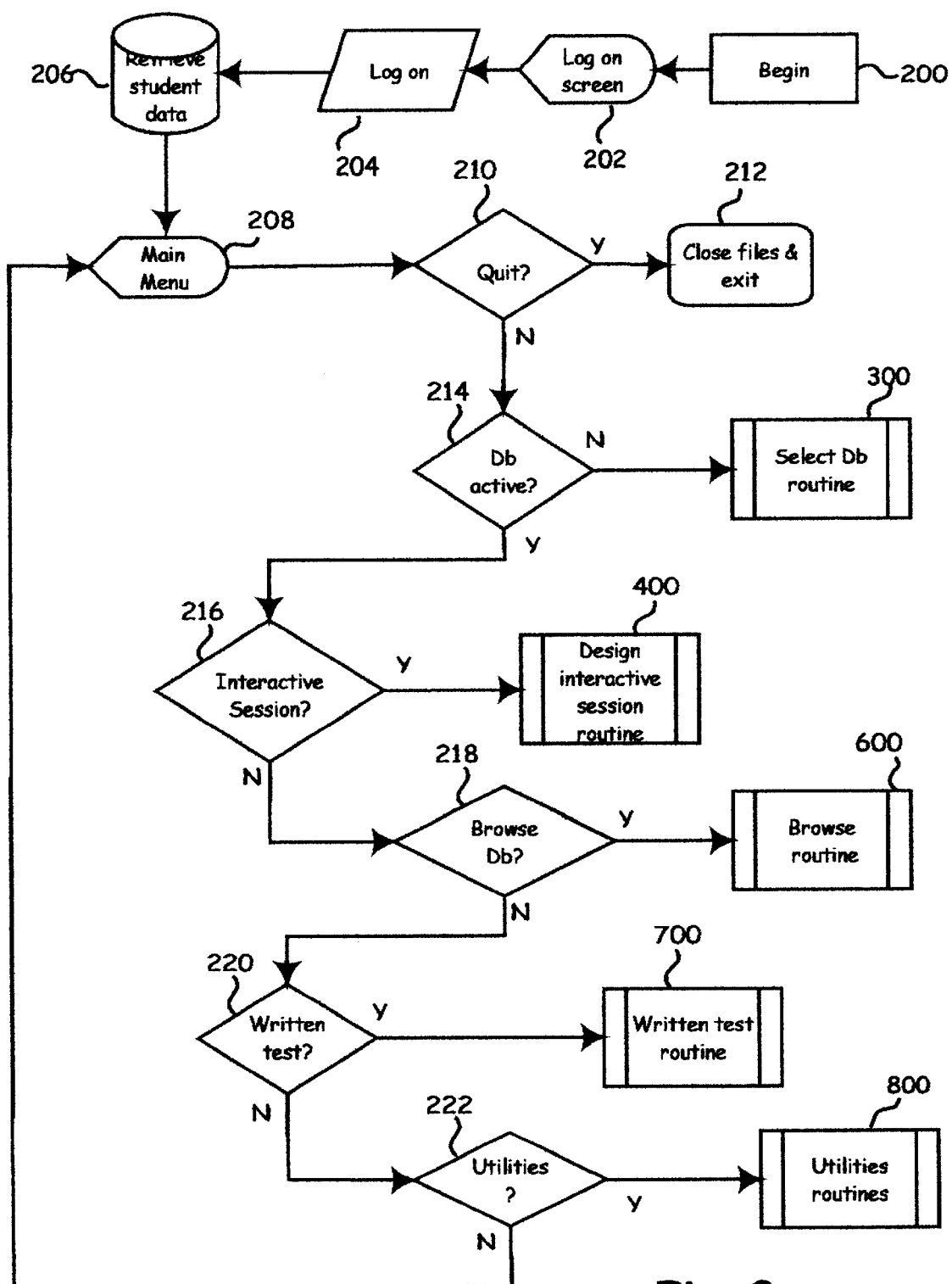
FIG. 2 is a flowchart of a software subroutine for a main menu according to the present invention.

FIG. 2 is a flow diagram of the log-on process used to gain access to the Main Menu and the system. (A welcome or "splash" screen may be displayed but is not necessary for carrying out the invention.) A sessions begins 200 when a log on screen 202 is presented to a student 110, who logs onto the system by inputting a user name and identification number 204. At block 206 the CPR 100 retrieves student data by searching the storage device 112 for a directory name that matches the user name that was input by the student. If none is found, the student is instructed to obtain a user name from the system administrator 108, who can add the student to he user list and set up a directory for the student.

If the student's user name corresponds to an existing directory, the CPU 100 then checks to ensure that the identification number input by the user matches the identification number found in the $3^{rd}$ field of the [0] record of the .CNT Array. If there is a match, the student is granted access to the system and the Main Menu is displayed. It is anticipated that this identification number may also be used to control access utility subroutines. For instance, the administrator 108 may maintain a list of users who have access to item editing or mass printing utilities discussed below.

In many situations that stand alone configuration is accessed by a single user, for example an individual studying for a board or bar examination who is not a part of a class. In such implementations the user name and identification numbers are superfluous and need not be used and the student's first contact with the system is the Main Menu, described following. It should also be noted that in these single-user implementations, there is no capability for determining dynamic values for PDR and PUR; therefore, these parameters are either provided as static parameters with values that are based on previously obtained population statistics, or they are deleted altogether.

The Main Menu

Upon successful log-on, Main Menu 208 is presented. While the figure shows the options of the Main Menu in a flow-chart arrangement, it is anticipated that the student may choose any of the options at any time without necessarily progressing through the diagram from top to bottom, as is conventional with menu screens.

The election 210 to quit from the system may be made from the Main Menu at any time, in which case subroutine 212 is activated to close all files, write them to disk where appropriate, and exit.

Initially the system determines whether a database is open 214. If no database (referred to as "Db" in all figures) is active, the student must select one at block 300 before proceeding. If a database is already active, the student may elect to select another one. The subroutine 300 for selecting databases is discussed below.

If, and only if, a database is active, the student may elect at 214 to proceed to subsequent options, which are: 1) to design an interactive session 216, in which case subroutine 400 is activated; 2) browse the database non-interactively 218, in which case subroutine 600 is activated; 3) design a written test 220, in which case subroutine 700 is activated; or 4) access utilities subroutines 222, in which case subroutine 800 is activated. These subroutines are discussed below.

Activating a Database

Figure 3:
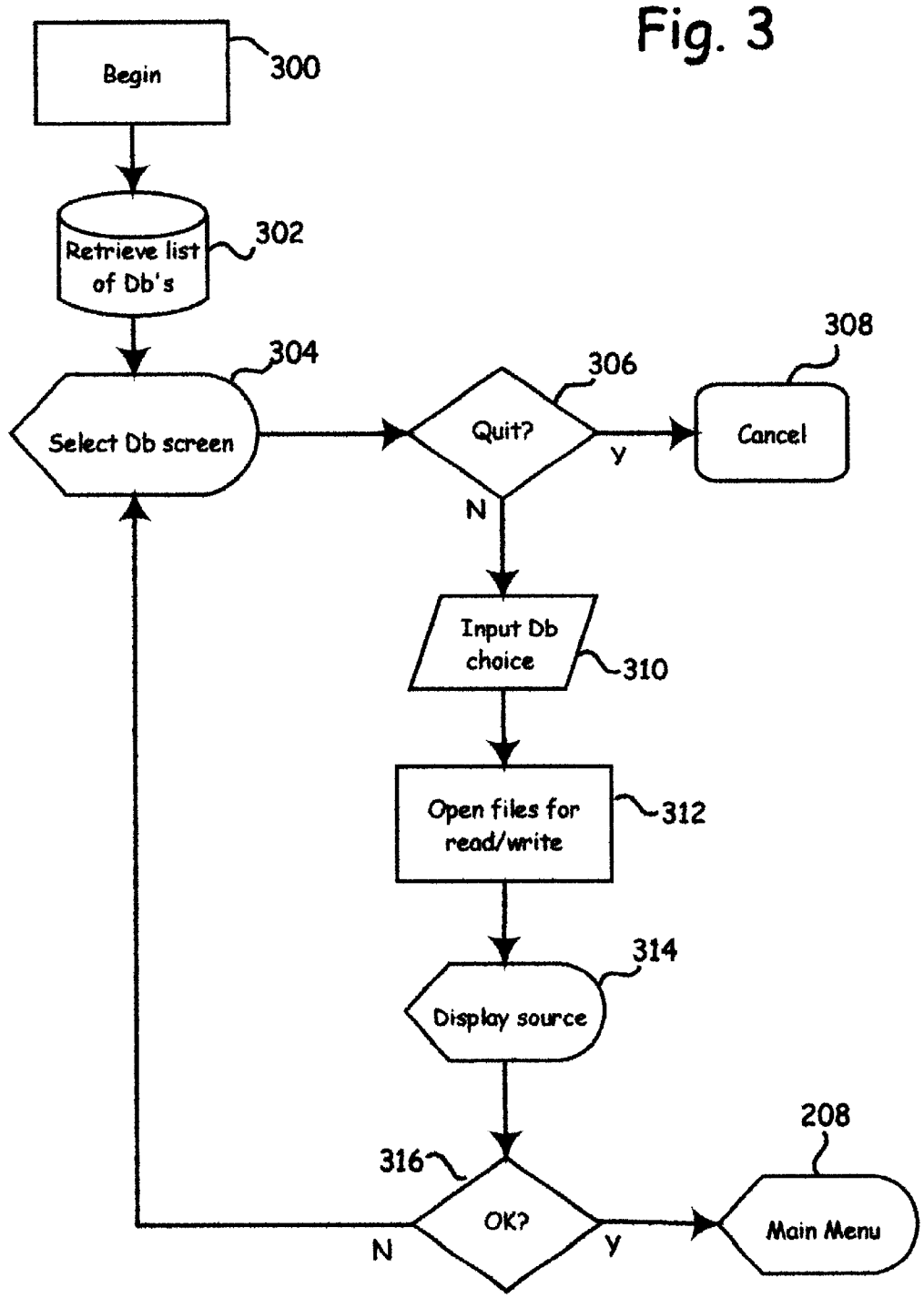
FIG. 3 is a flowchart of a software subroutine for selecting and activating an information database according to the present invention.

FIG. 3 is a flowchart of subroutine 300 used for selecting and activating a database with which to work. At block 302 the CPU 100 searches the storage device 112 and returns 304 all file names having a .QA file extension. This represents a list of all available databases. If the student elects 306 to quit at this point, or at any subsequent point, the system cancels all pending commands 308 and returns to the Main Menu 208.

From the list of available databases, the student selects 310 a database with which to work. If the student has previously worked with this database, a corresponding .CNT file will be found in the student's directory. If not, then the CPU 100, initializes an appropriate .CNT file and adds it to the student's directory. The system opens the appropriate .QA, .SI and .CNT files and initializes them for read/write operations 312.

After the student has elected the database with which to work and the appropriate files have been opened and initialized for read/write operations, information regarding the source, such as title, author, edition, etc., is displayed 314 so that the student may verify that he has the desired database. The student then elects 316 to return to the Main Menu 208 or to repeat the database selection process 304.

Designing an Interactive Study Session

Figure 4:
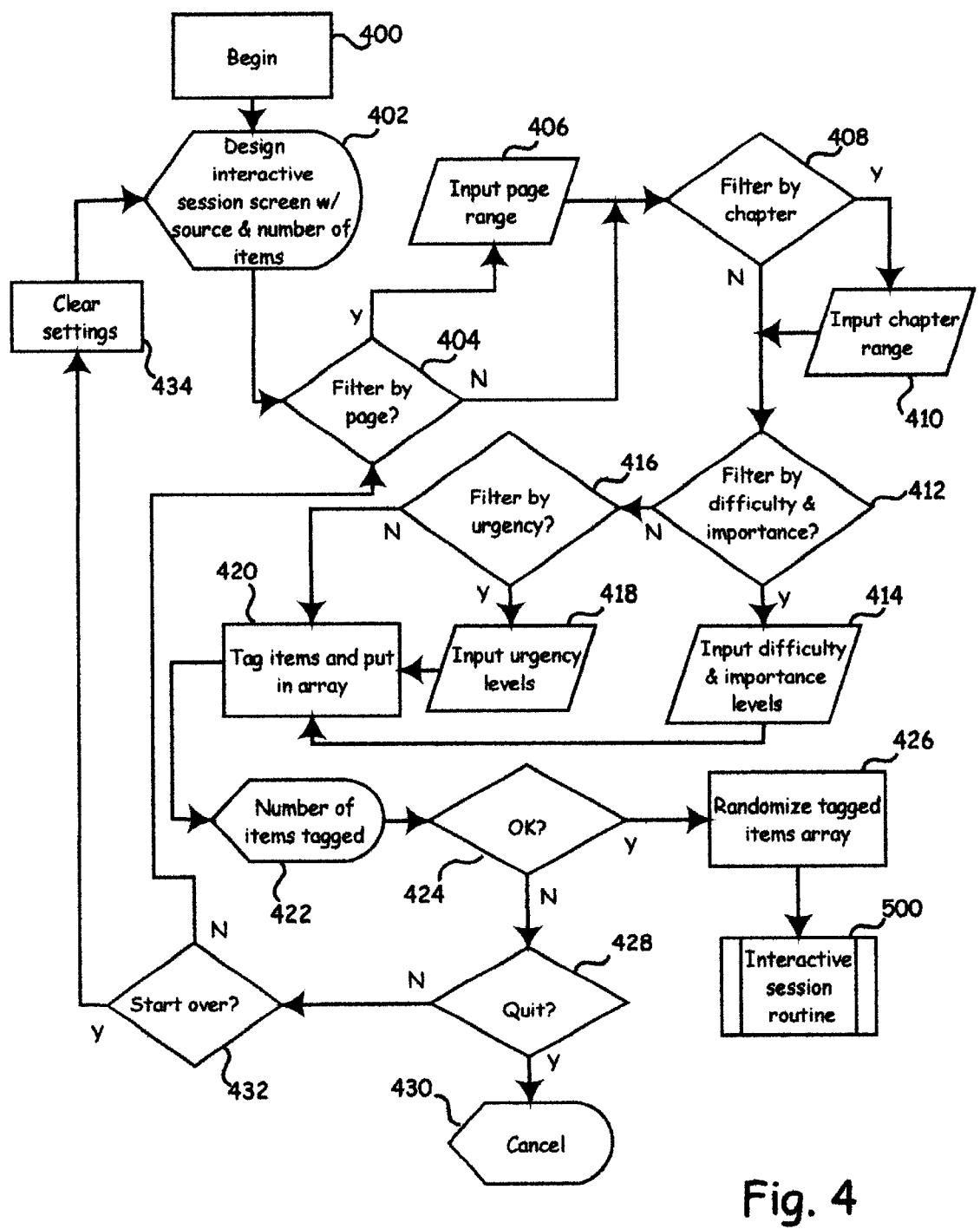
FIG. 4 is a flowchart of a software subroutine for designing an interactive session and for filtering and tagging units according to the present invention.

FIG. 4 is a flowchart diagram of the preferred means for designing an "interactive study session," which is a study session in which the student, the computer and the source interact synergistically to optimize the student's efforts, as described more fully below.

Briefly, designing an interactive study session means that the student sets the values of one or more item parameters in order to delimit the items that will be presented by the system. As noted above, the process of selecting the items that meet the student's criteria is referred to herein as "filtering," and the function by which the system identifies the appropriate items is referred to as "tagging." A number of programming techniques may be used to tag items. The technique used herein is to set up an one-dimensional array of integers in random access memory (RAM) having the same number of elements as the .QA Array. This array is referred to as a "Tagged Array." At the beginning of the design subroutine all elements of the Tagged Array are initialized to "1" except the [0] element, which is initialized to "0." The system then examines each item's 3-character string that codes for IDR, Importance Rank and IUR according to FIG. 9, and determines whether that item meets the filtering criteria input by the student. If there is no match, the contents of the corresponding element of the Tagged Array is re-set to "0." Once all of the items in the database have been examined, the elements of the Tagged Array contain a "1" for tagged items and a "0" for non-tagged items.

The student gains access to the module for designing an interactive study session 400 from the Main Menu 208. The screen display for designing an interactive session 402 presents the student with a plurality of choices, as follows.

The student may designate the subject matter of the information to be studied by filtering items on the basis of the page-range 404 and 406 and/or chapter-range 408 and 410 of the source from which the items were extracted.

The student may filter items on the basis of difficulty and/or importance 412, in which case he inputs 414 the desired tiers of IDR and Importance Rank. Any combination or permutation of IDR's and Importance Ranks may be selected.

Because an item's IUR is a function of both its IDR and Importance Rank, in the present embodiment the student may not elect to filter on the basis of Importance Rank/IDR and IUR simultaneously, although embodiments of the invention are anticipated in which the student may elect to filter on all three parameters simultaneously. This restriction is shown in FIG. 4 at blocks 412 and 416, which require the student to filter on IDR/Importance Rank or IUR. If the student prefers to filter on the basis of urgency, he may choose any combination of IUR tiers 418.

The display indicates how many items of each tier of each parameter are available in the database. The display also providers a counter of currently tagged items. If the student inputs no filtering criteria, the counter will indicate that the number of tagged items is the same as the total number of items in the database. It has been found that interactive sessions containing between fifty and two hundred items are the most effective.

While the possibility of doing so is anticipated, the present embodiment does not permit the student to filter on the basis of population parameters, such as PDR or PUR. This is because these parameters are used solely as a gauge by which the student measures his experience with a given item, or, more likely, group of items, with the experiences of the entire user-population. For instance, if the average PDR of the items taken from Chapter 5 of some source is Easy, but the student's average IDR for the same set of items is Hard, then the student may surmise that he may be having an inordinate amount of trouble with the material represented by that group of items; i.e., Chapter 5. This sort of analysis can reveal large areas of conceptual misunderstanding.

Once the student has completed inputting the parameters to be used to filter the items in the database, on command the system begins a subroutine 420 that examines each item in the .QA file sequentially and tagging those that match the parameters set by the student. Once all of the items have been examined, the system presents to the student information regarding the number of items currently tagged for use in the interactive study session 422 and asks if the current selection is satisfactory 424. The student may then elect to quit 428, in which case the cancel subroutine 430 closes open files and returns to the Main Menu 208. Alternatively, the student may elect to start over 432 in designing his interactive session, in which case all setting are cleared 434. The student may also elect at 432 to revise some filtering parameters without re-setting all settings.

If the student determines at 424 that the session he has designed is satisfactory, the system randomizes the array of tagged items 426 and the interactive study session begins 500.

Figure 5:
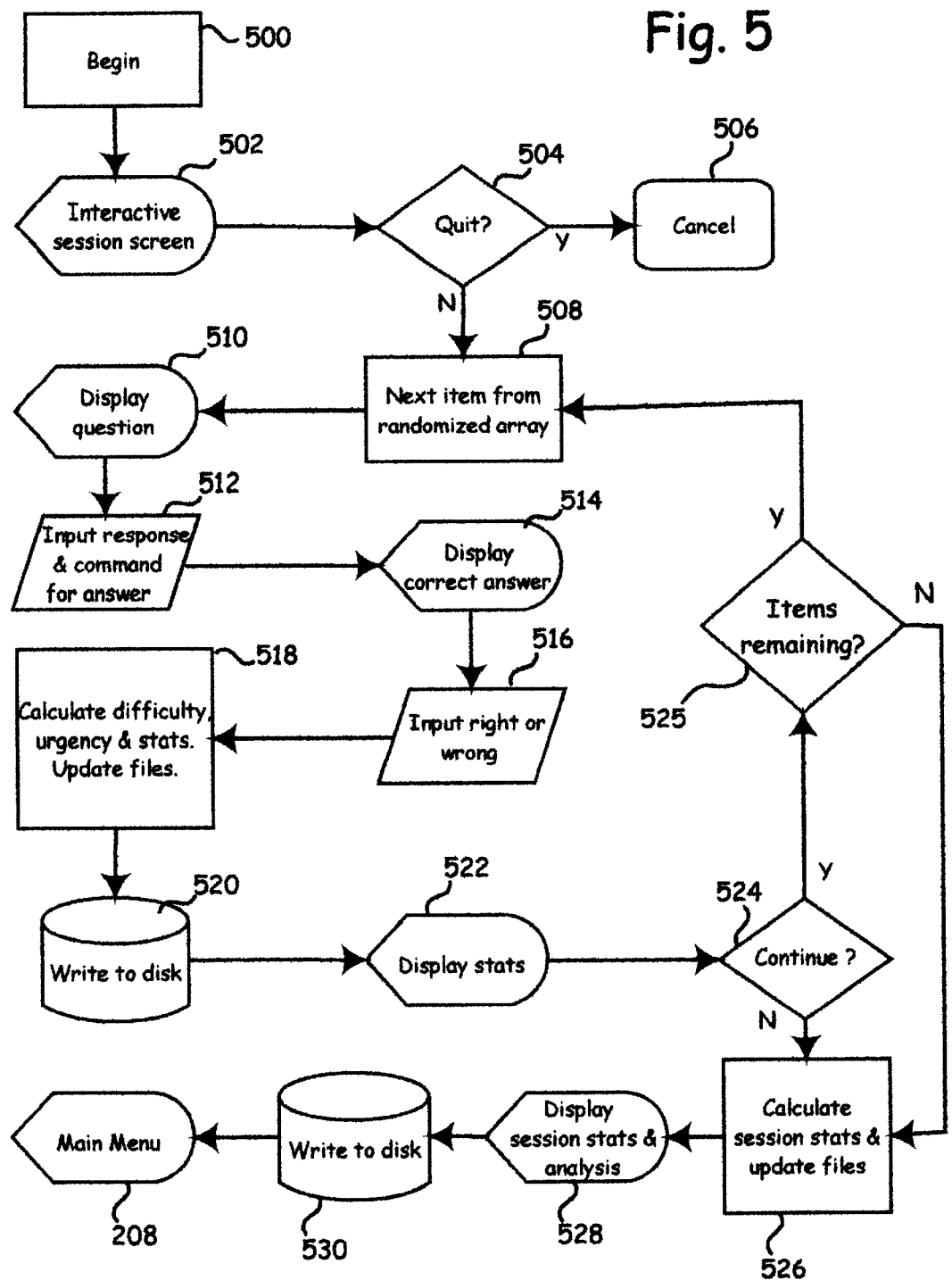
FIG. 5 is a flowchart of a software subroutine for carrying out an interactive session according to the present invention.

Randomization routines are well known in the filed and are supplied with most compilers. In the present embodiment, the integers 1 to n are randomized by such a routine, where n is equal to the total items in the database. As each random integer is generated, the system goes to that element in Tagged Array to determine whether the corresponding item has been tagged. If it has, then the system puts the integer into the next empty element of an one-dimensional array in RAM referred to herein as the "Random Array." this process is repeated until all the integers from 1 to n have been generated in random order and their sites in Tagged Array have been checked for tagged items. At the end of this process, Random Array holds a random sequence of tagged items, Running an Interactive Study Session Having designed the interactive study session and placed the tagged items into a random sequence, the system proceeds to the study session subroutine 500. FIG. 5 is a flowchart diagram of the interactive session subroutine. Display screen 502 directs the session. At anytime the student may elect 504 to quit, in which case the subroutine is canceled 506, and any fresh data that has not then been saved is discarded and the system returns to the Main Menu 208.

At block 508 the computer selects the first question from Random Array produced at block 426 of the design session. The system displays the stimulus 510, which is the contents of the $1^{st}$ field of the record of the corresponding element of the .QA Array, and waits for the student to input either his response or a command to continue 512. (In the present embodiment it is not necessary for the student to input a response because the system does not evaluate the student's response. However, variations of the invention are anticipated in which the student must input a response and the system evaluates that response.) The system next displays 514 the correct answer, which is the contents of the $2^{nd}$ field of the record of the corresponding element of the .QA Array. The student compares his response to the answer provided and indicates 516 whether or not his response was correct. If the student indicates that his answer was correct, the system enters a "2" into the next empty element of the item's 8-element Right Array, which is found at the $2^{nd}$ field of the .CNT Array. If the student indicates that his answer was incorrect, the computer enters a "1" into this element of the item's Right Array. If the Right Array for the item contains no empty elements (i.e., the student has attempted the item at least eight times already), then the computer shifts all values in the array to the "left" and enters the present value in the last element, which has become empty by the shifting process. Programming techniques for carrying out such array manipulations are trivial and are within the competence of anyone skilled in the art.

At block 518 the system calculates the percentage of correct responses the student has made to this item in the last eight (or, possibly, fewer) attempts. This is done by checking the current values of the elements of the item's Right Array, determining the number of total attempts and the number of correct responses and dividing the number of correct responses by the number of total responses. On the basis of the resulting ratio, the system re-evaluates the item's IDR, IUR, PDR and PUR according to tier descriptions given above. If the item has moved into a higher or lower tier, the system assigns new values to these parameters. The system then updates the .QA file, .CNT file and .SI file and writes the revised files to disk 520.

At block 522, the updated individual and population statistics are presented to the student before moving on to the next item. These statistics include the revised IDR, PDR, PUR and IUR of the present item, the percent of correct responses to that item, the page and/or chapter number of the source where the information may be found, the number of tagged questions remaining in the session, and the percentage of items answered correctly in the session thus far.

If the student elects 524 to continue with the session, and if any tagged items remain in Random Array 525, he activates the appropriate key and the next item is chosen from Random Array 508. This cycle repeats until the student elects 524 to quit or all of the tagged items have been displayed. At that point the system calculates 526 statistics for the session, including number of items attempted, number of tagged items that were not attempted during the session, percentage items answered correctly during the session, and overall performance level.

The foregoing summary information is displayed 528 to the student and written to disk 530. The system then returns to the Main Menu 208.

The overall performance level is an index of the student's current level of mastery of the entire database. It is calculated as follows: The system examines that last non-zero element of the Right Array ($2^{nd}$ field of the records of the .CNT Array) for each item in the database having a non-provisional IDR. The system then calculates the percentage of the last attempts of each item that were correct. This calculation yields a figure for the percentage of correct responses of all non-provisional items in the database on the basis of the last attempt to answer each item. However, the overall performance level is not calculated until at least 50% of all of the items in the database have been attempted three times or more. These are arbitrary thresholds, and other values may yield satisfactory results.

Browsing the Database Non-Interactively

Figure 6:
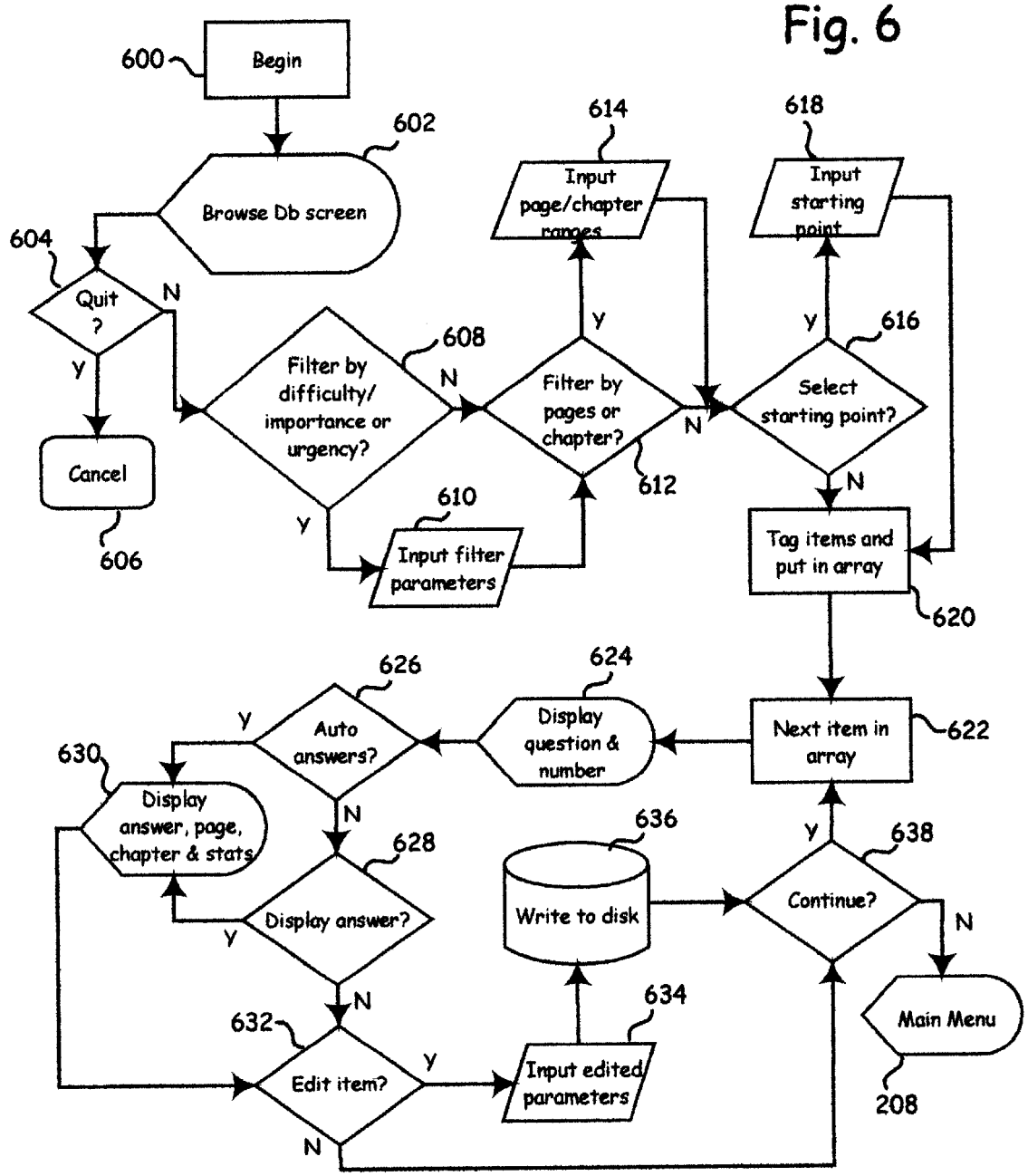
FIG. 6 is a flowchart of a software subroutine for filtering and tagging the units of, and for browsing, and information database in a non-interactive mode according to the present invention.

FIG. 6 is a flowchart diagram of the method by which the student "browses" a database. Browsing is a non-interactive means of studying the information contained in the database. In other words, the system presents the items to the student but does not keep track of the student's responses and does not modify the items' IDR, IUR, PDR or PUR. As in an interactive session, the student designs a browsing session by filtering the items to be presented. This allows the student to peruse jut those items and/or those areas that have proven most difficult for that student.

The student enters the Browse subroutine 600 from the Main Menu 208 and is presented an initial screen 602 used to design the browsing session. At anytime the student may elect 604 to quit, in which case the subroutine is canceled 606 and any fresh data that have not been saved are discarded and the system returns to the Main Menu 208.

By exercising option 608 the student may elect to filter the database on the basis of IDR, Importance Rank and/or IUR, in which case he enters the tiers of these parameters he wishes to use as filtering criteria 610. At blocks 612 and 614, the student may specify a page and/or chapter range with which to filter the items. At blocks 616 and 618 the student may direct the system to begin the filtering process at a specific item in the .QA Array. As the student alters filter parameters, the Browse screen 602 constantly advises the student of the number of items presently tagged for browsing. Although FIG. 6 presents the foregoing options sequentially, they may be accessed in any order, or not at all. If no options are exercised for filtering the database, the counter will indicate that the number of tagged items is the same as the total number of items in the database, and the system will begin with the item at element [1] of the .QA Array and present all items in sequence until the last item has been presented. In the present embodiment the items are not presented in random order during browsing, but rather sequentially in the order they were entered into the .QA Array. This allows the student to step through the items sequentially, in either a forward or backward direction, inspecting each tagged item in turn.

Upon command, subroutine 620 searches the active database, tags the appropriate items by setting a flag in the corresponding element of a Tagged Array, as described above.

The system then selects the first tagged item 622 and presents the stimulus and the item's number 624. The student may elect 626 to have the answer presented either automatically or only on command. With the answers presented on command, the student is challenged to answer the items as in an interactive session, but without having the item's parameters modified as a result of correct or incorrect responses. Upon command 628 the system presents the correct answer and statistics including current IDR, Importance Rank and IUR 630. The source page and chapter from which the item was taken are also presented so that the student may consult the source in order to clear up difficulties the student may be having with the current subject matter.

If the user's ID number, which is held in the $3^{rd}$ field of the record in the [0] position of the .CNT Array, indicates that the user has authority to edit items, the user may elect at block 632 to edit the item, in which case new information is input 634 and the modified file is saved 636.

At block 638 the student elects to continue to the next item or return to the Main Menu 208. It is to be emphasized that information regarding the student's performance is not saved during a Browse session. This permits the student to peruse all or specified items of the database without affecting the difficulty or urgency parameters of those items. This exercise, particularly when carried out with the source at hand, is valuable for efficiently reviewing areas that are presenting problems for the student. For instance, by filtering for items with an IDR of Impossible or an IUR of Critical, the student can focus his attention first and foremost on the information that has proven to be the most troublesome.

Designing and Taking Formal Written Practice Tests

Figure 7:
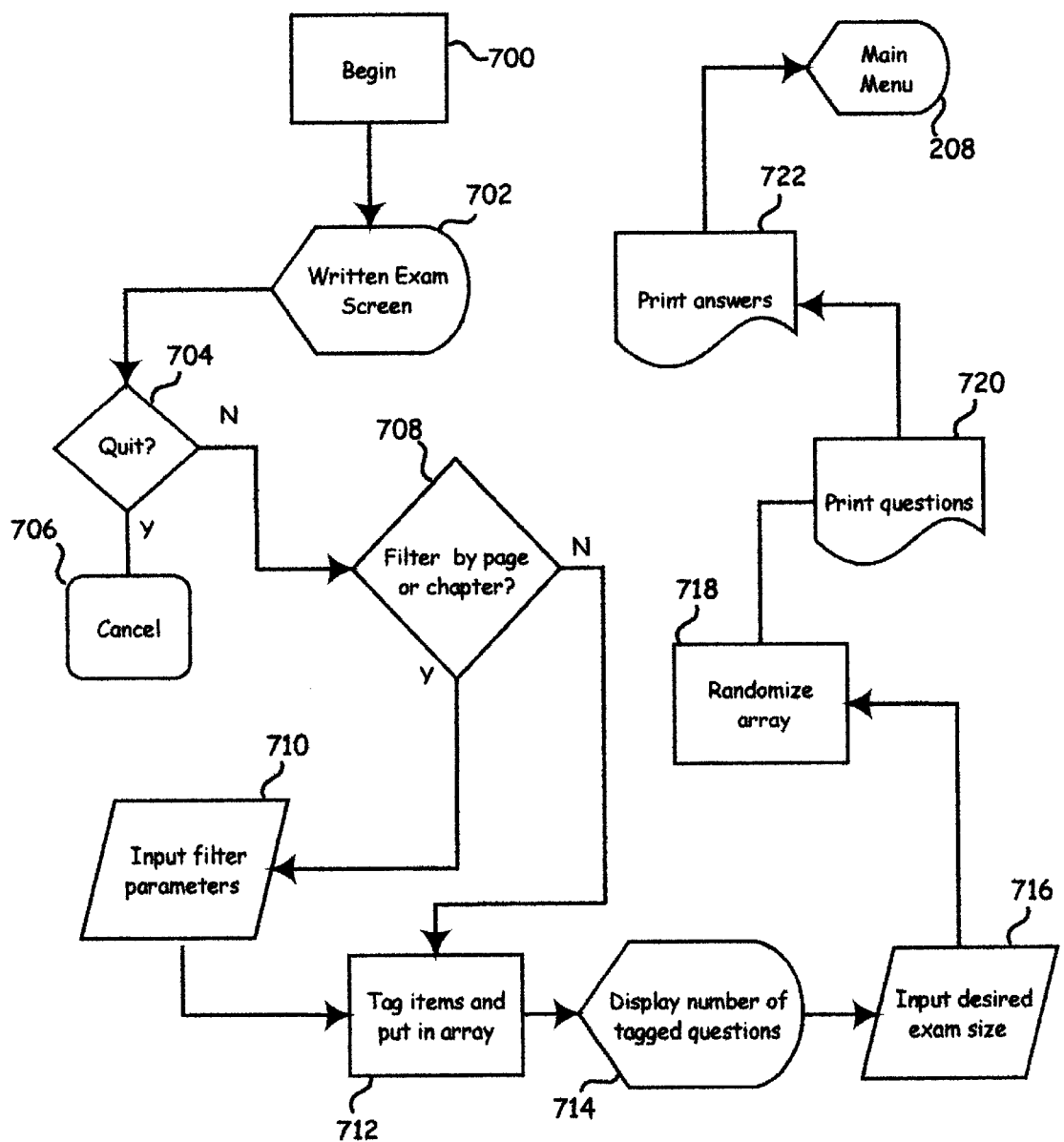
FIG. 7 is a flowchart of a software subroutine for designing and implementing a printed self-evaluation test according to the present invention.

FIG. 7 is a flowchart diagram of the subroutine 700 that produces formal written practice examinations from the items in the databases. This subroutine is accessed from the Main Menu 208. Block 702 represents the screen that is used to design the written examination. At anytime the student may elect 704 to quit, in which case the subroutine is canceled 706 and the system returns to the Main menu 208.

The written practice examinations are meant to simulate, as closely as possible, real examinations. Therefore, the items for a written practice examination are chosen from the .QA file at random without any filtering on the basis of IDR, Importance Rank or IUR. This produces a pool of test items having a random mixture of tiers of IDR, Importance Rank and IUR. The student may elect 708 to filter the items on the basis of subject matter. This done by inputting 710 the page and/or chapter ranges of the source from which the items were derived. The items in the desired page/chapter ranges are tagged 712 by setting a flag at the corresponding element of Tagged Array and the total number of tagged items, the size of the item pool, is displayed 714. The student then inputs 716 the desired number of items to be drawn from said item pool, whereupon the system randomizes the item pool 718 using the same randomization technique discussed above. Drawing items sequentially from the resulting Random Array, the system prints out the desired number of questions 720 and the corresponding answers 722 on separate sheets before returning to the Main Menu 208.

Accessing Utilities Subroutines

Figure 8:
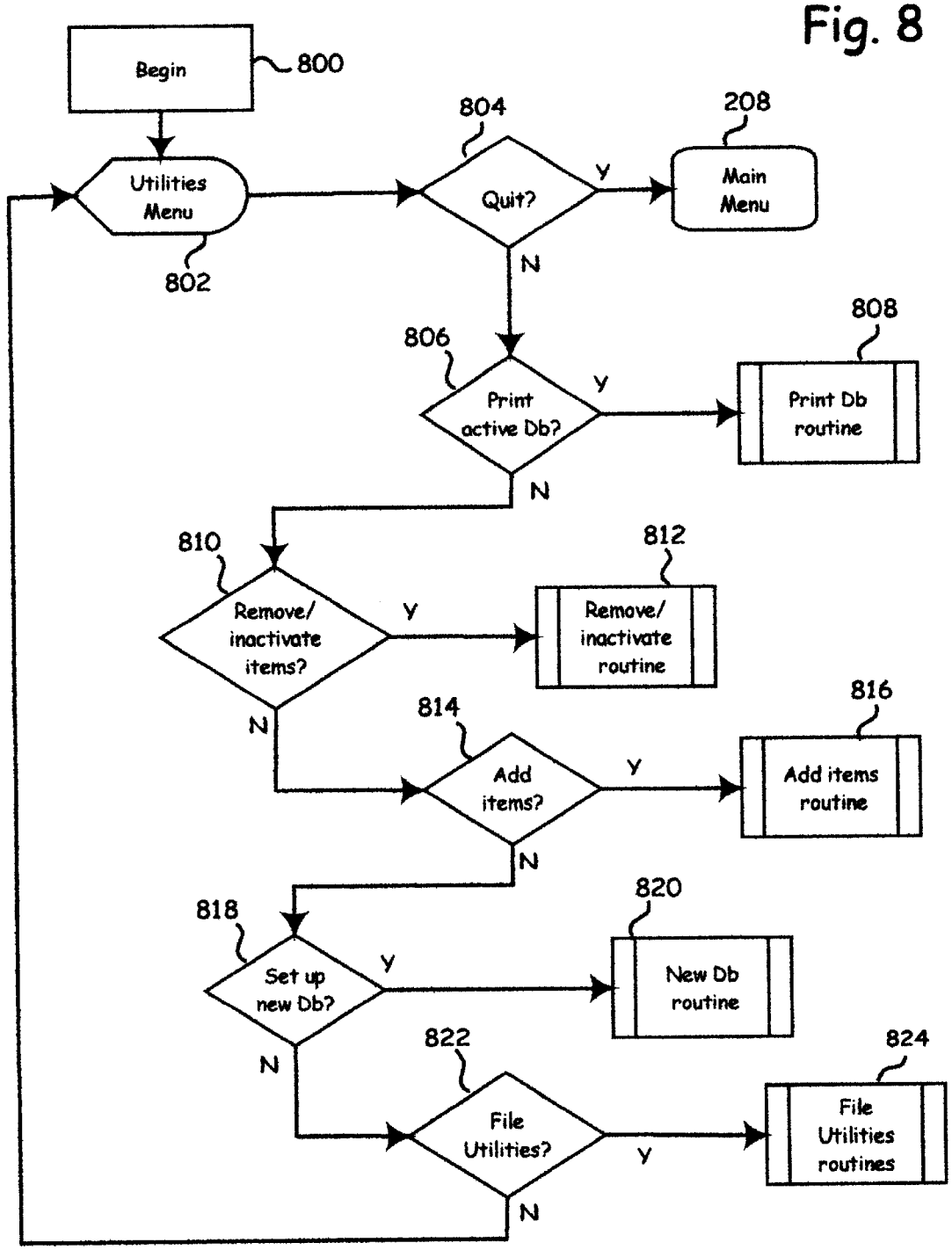
FIG. 8 is a flowchart of a software subroutine for carrying out various utility functions according to the present invention.

FIG. 8 is a flowchart diagram of the Utilities subroutine 800 that is accessed from the Main Menu 208. It is envisioned that some or all of the utility subroutines discussed here may be restricted from student access and available only to reachers or course administrators. Such restrictions are easily accomplished, using techniques commonly known to those skilled in the art, by screening users on the basis of the user ID number held in the $3^{rd}$ field of [0] element of the .CNT Array.

Block 802 represents the screen that is presented to the student upon entering the Utilities subroutine. At anytime the student may elect 804 to quit, in which case the subroutine is canceled and the system returns to the Main Menu 208. Although the options are presented in FIG. 8 sequentially, it is anticipated that any option may be chosen at any time while the subroutine is active.

At block 806 the user may elect to print out the active database. The subroutine 808 that is accessed in order to implement this election steps through the .QA Array of the active database and displays on the printing device of the computer terminal 106 each item in the database sequentially, printing each stimulus, response, source page and chapter numbers, percent correct responses, the current values of the filtering parameters IDR, Importance Rank and IUR, and the current population statistics, PDR and PUR. It is anticipated that by using the filtering techniques discussed above, the user may be able to restrict the items that are printed.

At block 810 the user may access a subroutine 812 to remove or inactivate specific items from the currently active database. By "inactivate" it is meant that the item is marked so that it will be ignored by the filtering subroutines described above, but it is not removed from the database. By accessing the same subroutine later, an inactivated item may be re-activated. This inactivation and re-activation is accomplished by changing the third character of the three-character IDR code string (shown in FIG. 9) to "X." Thus, an item that is ranked Vital, Simple, and Safe would have its code modified from "VSS" to "VSX" in order to inactivate it. While inactivated, none of the data specific to that item is altered. To re-activate the item, the subroutine 812 determines its IDR and its Importance Rank and re-calculates its IUR according to FIG. 9. For the example given, upon re-activation the item's code would be re-set to "VSS."

At block 814 the suer may access subroutine 816 to add items to the active database. By means of this subroutine the suer adds a new item to the database by inputting stimulus, answer, page and chapter numbers of the source, and Importance Rank. The new item is then appended onto the database at the next element of the .QA Array, and the .SI file and .CNT file are modified appropriately. A more sophisticated subroutine is anticipated that would insert the new item into the .QA Array at a site determined by the page and chapter number of the source. While slightly more complex, this subroutine allows for all items related by subject matter to be grouped in the .QA Array.

At block 818 the user may access subroutine 820 to set up a new database. The user inputs a name for the database and information identifying the source from which the database will be derived. The subroutine then sets up and initializes the requisite .QA, .CNT and .SI files and prepares them for data input, which is accomplished by subroutine 816.

At block 822 the student may access a subroutine 824 for carrying out miscellaneous file utilities. Such utilities include ascertaining the pathname of the core program and database files, moving files from one location to another, or copying files from one location to another. Because there are standard techniques known to those skilled in the art for implementing such utilities, they are not further elaborated here.

Embodiments of the Invention Encompassing Networked Configurations

The embodiment of the invention discussed above is a stand-alone configuration; i.e., Configuration (a). The invention is also amenable to implementation in configurations in which some or all of the data storage, and some or all of the data processing are carried out centrally while data input and output occur remotely, as in Configurations (b) and (c). Such implementations would include networked systems and systems accessible through the Internet. Although the file locations would differ from the stand-alone configuration, the principles, subroutines, processes and file structures disclosed above would still apply.

For instance, a system of Configuration (b) is easily implemented from the foregoing description so as to be accessed through the Internet. In such an embodiment, the core program and all data files are maintained on a central storage device and accessed through a central CPU. Alternatively, the core program and the appropriate .CNT files are downloaded once through the Internet to the user's computer, and the desired .QA files are either downloaded on an ad hoc basis or accessed while on-line. The necessary .CNT and .SI files are then produced by the core program and initialized locally.

The advantage of multi-user configurations, so long as they are configurations in which common .QA files are accessed by all users, is that such systems provide a much larger pool of users from which population statistics may be obtained. For example, when using an Internet-accessed implementation of the invention to prepare for a state law bar or medical board examination, an individual user can compare his performance at any point in time with respect to specific items, or with respect to whole areas of the subject matter, to the performance of hundreds or thousands of other users. Subroutines are appended to the system described above that permit the individual user to make a variety of comparisons between his performance and that of the entire student population. Given that the population performance data are readily accessible in fields 6–8 of the capabilities of one skilled in the art.

What I'm claiming is:

1. A method to facilitate learning/memorization of information by at least one user, including the steps of:
    (a) formatting the information into units;
    (b) storing the units on at lease one computer-accessible storage device; and
    (c) ascertaining individualized difficulty rank (IDR) values for units such that each IDR value represents how difficult a specific unit currently is for the user.

2. A method as claimed in claim 1, further including the step of storing the IDR values on at least one computer-accessible storage device such that each IDR value is identified to its unit.

3. A method as claimed in claim 1, further including the steps of:
    (d) filtering the units on the basis of at least one preferred IDR value such that units having the preferred IDR value(s) are tagged; and
    (e) displaying tagged units seriatim to the user.

4. A method as claimed in claim 3, further including the step of sorting units tagged at step (d) into a random order prior to displaying them seriatim at step (e).

5. A method as claimed in claim 3, further including the steps of:
    (f) evaluating how well the user performs with respect to each unit displayed at step (e); and
    (g) re-calculating the IDR value of the unit on the basis of the evaluation made at step (f) such that the re-calculated IDR value represents how difficult the unit currently is for the user.

6. A method as claimed in claim 5, further the step of
    storing the re-calculated IDR value on at least one computer-accessible storage device such that the re-calculated IDR value is identified to its unit.

7. A method as claimed in claim 1, further including the steps of:
    (h) assigning an importance rank value to each unit; and
    (i) storing the importance rank values on at least one computer-accessible storage device.

8. A method as claimed in claim 7, further including the steps of:
    (j) filtering the units on the basis of at least one preferred importance rank value such that units having the preferred importance rank value(s) are tagged; and
    (k) displaying tagged units seriatim to the user.

9. A method as claimed in claim 8, further including the step of:
    sorting units tagged at step(j) into a random order prior to displaying them seriatim at step (k).

10. A method as claimed in claim 8, further including the steps of:
    (l) evaluating how well the user performs with respect to each unit displayed at step (k); and
    (m) re-calculating the IDR value of the unit on the basis of the evaluation made at step (l) such that the re-calculated IDR value represents how difficult the unit currently is for the user.

11. A method as claimed in claim 10, further including the step of:
    storing the recalculated IDR value on at least one computer storage device such that the re-calculated IDR value is identified to its unit.

12. A method as claimed in claim 7, further including the step of:
    ascertaining individualized urgency rank (IUR) values for each unit such that each IUR value represents the current IDR value of the unit weighted by the importance rank value assigned to the unit.

13. A method as claimed in claim 12, further including the step of:
    storing the IUR values on at least one computer-accessible storage device.

14. A method as claimed in claim 12, further including the steps of:
    (n) filtering the units on the basis of at least one preferred IUR value such that units having the preferred IUR value(s) are tagged; and
    (o) displaying tagged units seriatim to the user.

15. A method as claimed in claim 14, further including the step of:
    sorting units tagged at step (n) into a random order prior to displaying them seriatim at step (o).

16. A method as claimed in claim 14, further including the steps of:

(p) evaluating how well the user performs with respect to each unit displayed at step (o); and (q) re-calculating the IDR value of the unit on the basis of the evaluation made at step (p) such that the re-calculated IDR value represents how difficult the unit currently is for the user.

17. A method as claimed in claim 16, further including the step of storing the re-calculated IDR value on at least one computer storage device such that the re-calculated IDR value is identified to its unit.

18. A method as claimed in claim 1, further including the steps of:

(r) assigning reference numbers to the units, said reference numbers chosen such that they identify a specific site in a source where the information used to produce the units can be found; and (s) storing the reference numbers on at least one computer-accessible storage device such that each reference number is identified to its unit.

19. A method as claimed in claim 18, further including the steps of:

(t) filtering the units on the basis of at least one preferred reference number such that units having the preferred reference number(s) are tagged; and (u) displaying tagged units seriatim to the user.

20. A method as claimed in claim 19, further including the step of:

sorting units tagged at step (t) into a random order prior to displaying them seriatim at step (u).

21. A method as claimed in claim 19, further including the steps of:

(v) evaluating how well the user performs with respect to each unit displayed at step (u); and (w) re-calculating the IDR value of the unit on the basis of the evaluation made at step (v) such that the re-calculated IDR value represents how difficult the unit currently is for the user.

22. A method as claimed in claim 21, further including the step of storing the re-calculated IDR value on at least one computer storage device such that the re-calculated IDR value is identified to its unit.

* * * * *

UNITED STATES PATENT AND TRADEMARK OFFICE
CERTIFICATE OF CORRECTION

PATENT NO.    : 6,287,123 B1
DATED         : September 11, 2001
INVENTOR(S)   : Denis O'Brien It is certified that error appears in the above-identified patent and that said Letters Patent is hereby corrected as shown below:

Column 22,
Line 12, after "further" insert -- including --

Signed and Sealed this

Thirteenth Day of August, 2002

Attest:

Attesting Officer

JAMES E. ROGAN
Director of the United States Patent and Trademark Office